United States Patent
Kürzinger et al.

(10) Patent No.: US 6,623,770 B2
(45) Date of Patent: *Sep. 23, 2003

(54) FLAKE FEED, ESPECIALLY FOR AQUATIC ANIMALS

(75) Inventors: Hubert Kürzinger, Melle (DE); Hartmut Schmidt, Georgsmarienhütte (DE); Dietmar Kuhlmann, Stadthagen (DE); Rudiger Heine, Lengerich (DE)

(73) Assignee: Tetra Holding (US), Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/205,675

(22) Filed: Jul. 25, 2002

(65) Prior Publication Data

US 2002/0187218 A1 Dec. 12, 2002

Related U.S. Application Data

(63) Continuation of application No. 10/004,506, filed on Nov. 2, 2001, now Pat. No. 6,426,101, which is a continuation of application No. 09/297,843, filed as application No. PCT/EP97/06753 on Dec. 3, 1997, now abandoned.

(30) Foreign Application Priority Data

Dec. 11, 1996 (DE) .......................................... 196 51 561

(51) Int. Cl.$^7$ .............................. A23K 1/00; A23K 1/18
(52) U.S. Cl. ............................................. 426/2; 426/805
(58) Field of Search ...................................... 426/2, 805

(56) References Cited

U.S. PATENT DOCUMENTS

| | | | | | |
|---|---|---|---|---|---|
| 3,438,781 A | * | 4/1969 | MacMillan et al. | ............... | 99/2 |
| 3,528,815 A | | 9/1970 | Trotter | ............................ | 99/2 |
| 4,696,634 A | | 9/1987 | Zeller | ......................... | 435/237 |

FOREIGN PATENT DOCUMENTS

| CS | 128988 | * | 9/1968 |
|---|---|---|---|
| EP | 326633 | * | 8/1989 |
| EP | 0337573 | | 10/1989 |
| GB | 0768189 | | 2/1957 |
| GB | 2257012 | | 1/1993 |

* cited by examiner

Primary Examiner—Chhaya D. Sayala
(74) Attorney, Agent, or Firm—Merchant & Gould, P.C.

(57) ABSTRACT

Novel flake feeds are described, especially for aquatic animals, such as fish, shrimps and invertebrates, characterised in that the flakes have a uniform form, a variable thickness and a water content of from 1 to 30%, as well as a process for the production thereof.

9 Claims, No Drawings

FLAKE FEED, ESPECIALLY FOR AQUATIC ANIMALS

This application is a continuation of U.S. application Ser. No. 10/004,506, filed Nov. 2, 2001, now U.S. Pat. No. 6,426,101, which is a continuation of U.S. application Ser. No. 09/297,843, filed Aug. 20, 1999, abandoned, which is a 371 of PCT/EP97/06753 filed Dec. 3, 1997.

DESCRIPTION

The present invention is concerned with novel flake feeds for aquatic animals, especially fish, shrimps and invertebrates, in fresh and sea water and is also concerned with a process for the production thereof.

The production of cereal flakes, for example of rolled oats, for human nutrition with the help of a flaking process is known. Cereal flakes are products of hulling which are preponderantly produced from oats, wheat, rye, barley, millet and rice. For the production of rolled oats, whole grains, as well as groats, are converted into a formable, elastic structure by hydrothermal treatment. The damped material is applied uniformly to a flaking cylinder mill, the pressure of which can be regulated hydraulically. A differentiation is made between large leaf flakes (flakes from the whole grain) with about 0.5 mm rolling-out thickness and small leaf flakes (flakes from groats) with 0.3 mm rolling-out thickness.

Flake feeds are also known for the nutrition of warm and cold water ornamental fish in fresh and sea water. At present, flake feeds for fish are characterised in that they are produced with drum driers. Drum drying is a process for the drying of raw material mixtures which are made liquid to pasty by the addition of water. At the moment, it represents the state of the art and is generally available, Therefore, flake feed for ornamental fish from different manufacturers scarcely differ superficially.

In the case of the production of flake feeds for ornamental fish, an internally heated roller is impinged against uniformly by means of an application device over the whole length of the roller with a previously pasted, viscous raw material mixture (moisture content of the paste about 75%) which, in the case of rotation, the roller takes with it as a thin film on the surface of the roller. During the rotary movement, the water evaporates, which requires a high supply of energy. The dried product is removed with a moisture content of about 2 to 5% by means of knives as a flake strip from the surface of the roller. The final moisture content, which plays an important part for the techanical properties, especially the brittleness of the feed flakes, as well as for the acceptance thereof, can only be adjusted within narrow limits in the case of this process. The thickness of the flake strip produced according to the above-mentioned process is about 0.15 mm, depending upon the raw materials used, and cannot be varied very much. The steam temperature for beating the roller is 120 to 165° C. Therefore, heat-labile raw materials, for example enzymes and probiotics, cannot be used. After the production process, a comminution of the cohering flake strip takes place to give a saleable flake feed which consists of individual flakes of differing sizes which are characterised by an uneven form and which find use for the nutrition of aguatic animals, especially of ornamental fish.

The object of the present invention is the development of novel flake feeds, especially for aquatic animals, for example fish, shrimps and invertebrates, which can be used in fresh and sea water and especially for warm and cold water ornamental fish in aguaria and garden ponds which, for the user, differ comprehensibly from the products previously on the market with regard to thickness, brittleness, consistency and/or external form or by the use of hitherto not usable, heat-labile raw materials.

Surprisingly, it has now been found that, by means of a special production process, the rolling out of individually formed bodies, preferably produced with an extruder, for example a double-screw extruder or expander, such feed flakes can be produced. Without additional working steps, this process provides uniformly shaped flakes with a veriable thickness of from 10 $\mu$m to 5 mm and preferably of from 80 to 140 $\mu$m. Due to the possibility of a variation of the flake form, of the flake thickness and of the flake moisture content, as well as due to the possibility of using heat-labile raw materials, the flakes so produced possess substantially better properties than the flake feeds at present known.

Therefore, the subject of the present invention are novel flake feeds for aquatic animals, for example fish, shrimps and invertebrates, in fresh and sea water which are characterised in that the flakes have an uniform shape, a variable thickness and a water content of from 1 to 30% and preferably of from 4 to 25%.

A further subject of the present invention is a process for the production of a flake feed from appropriate feed components which comprises the following steps:

a) production of formed bodies of appropriate dimensions; and b) rolling out of the formed bodies to give individual flakes.

The special production process comprises the following process steps. Preferably by means of an extruder, for example a double-screw extruder, formed bodies (water content about 40% or less) are produced of such dimensions that, in the case of subsequent rolling out thereof in an appropriate cylinder mill, individual flakes are produced with a variable thickness of from 10 $\mu$m to 5 mm and a diameter of from 1 to 100 mm, The distance between the rollers of a flaking device having two rotating rollers determines the thickness of the flakes. In the case of the production of the formed bodies, the temperature can be reduced to <70° C. These flakes can then be subjected to a drying and/or cooling to the desired end water content.

The production process according to the present invention permits the industrial production of feed flakes with improved functional and physical properties which could not be achieved with the previously known processes for the production of flake feeds by the drying of a raw material slurry on drum driers:

Uniform flake form: there can be produced uniformly shaped, for example round, oval, corrugated, heart- or fish-shaped flakes or otherwise uniformly geometrically formed flakes;

Uniform flake size: by means of the directed production of formed bodies of definite size with subsequent rolling out, flakes can be produced in uniform size of from 1 to 100 mm;

Improved mechanical properties: by means of the specific adjustment of the water content, the flake stability is increased. The proportion of small flakes (broken pieces) is thereby reduced, for example in the case of the production of flake mixtures, which leads to a reduction of the bulk density or of the package filling weight. Additional working steps, for example sieving off of the broken pieces, can be omitted;

Improved flake consistency, production of soft flakes: by adjustment of a water content of 8 to 25%, it is possible to produce extremely soft and elastic flakes which are better taken up by the fish;

Specific adjustment of the floating and sinking behaviour: the adjustment of the roller distance in the case of the rolling-out process determines the flake thickness. Thinner flakes than the ones at present known show an improved floating and sinking behaviour. Thicker flakes possess an increased speed of sinking. Thus, a mixture of flakes of differing thickness leads to a product which is equally optimal for all fish, regardless of whether they preferably feed from the surface, from the middle water or from the bottom;

Ability to produce multicoloured individual flakes: by means of the flaking of multicoloured formed bodies, flakes can be produced which have two or more colours;

Introduction or protection of temperature-sensitive substances: the low process temperatures of the novel process<70° C.) makes possible the use of raw materials which, because of their temperature lability, could not previously be used:
  natural odoriferous and flavouring materials, as well as natural colouring materials: improve the attractiveness and acceptance of the flakes;
  active enzymes: improve the bioavailability of the nutrient materials: such a feed reduces the pollution of the water caused bg the feed and contributes to an ecological optimisation of the water quality;
  living bacteria and yeasts: can be used as digestion regulators (probiotics): in this way, an improved weight development of the fish can be achieved in the case of the same feed consumption;
  addition of promoters, for example growth and spawn promoters for the improvement of growth and for increasing the spawning readiness;
  the breakdown rates of value-determining raw material components (vitamins, colour strengtheners) are reduced by the low process temperatures; the safety additives used for this purpose can be reduced, which leads to cost savings.

Furthermore, the energy costs for the drying of the flake feed to the desired end moisture content are considerably lower than in the case of production processes according to the prior art which depend upon the drum drying of a raw material slurry, which usually has an initial water content of >60%, since, in the case of the process according to the present invention, the initial moisture content of the formed bodies is <40% water. Thus, the novel production process according to the present invention offers considerable advantages in comparison with the prior art not only with regard to the properties of the flake feed to be produced therewith but also with regard to the energy costs necessary for the production.

What is claimed is:

1. A flaked feed for aquatic animals comprising uniformed bodies of feed having a water content of from 1 to 30% and a variable thickness from 80 to 140 $\mu$m.

2. The flaked feed according to claim 1, wherein the feed contains individual flakes with a diameter of from 1 to 100 mm.

3. The flaked feed according to claim 1, wherein the flakes contain temperature-sensitive substances.

4. The flaked feed according to claim 3, wherein the temperature-sensitive substances are selected from odoriferous and flavouring materials, colouring materials, enzymes, promters probiotics vitamins and colour strengtheners.

5. The flaked feed according to claim 4, wherein the probiotics are living bacteria or yeasts.

6. The flaked feed according to claim 4, wherein the promoters are growth promotors or fertility promoters.

7. The flaked feed according to claim 1, wherein the flakes have a round, oval, corrugated, heart- or fish-shaped form or some other uniform geometrical shape.

8. A method of feeding aquatic animals comprising providing a flaked feed according to claim 1 in fresh or sea water.

9. The method of claim 8, wherein the aquatic animals are fish, shrimps or invertebrates.

* * * * *